(12) United States Patent
Neubert et al.

(10) Patent No.: US 8,197,145 B2
(45) Date of Patent: Jun. 12, 2012

(54) REVOLVING JOINT

(75) Inventors: Frank Neubert, Schonungen (DE);
Franz-Josef Ebert, Hammelburg (DE);
Jurgen Klutsch, Schonungen (DE);
Gerold Strum, Konigsburg (DE)

(73) Assignee: Schaeffler KG (DE)

( * ) Notice: Subject to any disclaimer, the term of this patent is extended or adjusted under 35 U.S.C. 154(b) by 819 days.

(21) Appl. No.: 11/719,173

(22) PCT Filed: Nov. 4, 2005

(86) PCT No.: PCT/DE2005/001984
§ 371 (c)(1),
(2), (4) Date: Jan. 16, 2009

(87) PCT Pub. No.: WO2006/050700
PCT Pub. Date: May 18, 2006

(65) Prior Publication Data
US 2009/0154865 A1 Jun. 18, 2009

Related U.S. Application Data

(60) Provisional application No. 60/627,541, filed on Nov. 12, 2004.

(51) Int. Cl.
*F16C 32/00* (2006.01)
*F16C 41/04* (2006.01)

(52) U.S. Cl. .................. 384/448; 385/543; 385/609

(58) Field of Classification Search .................. 384/448, 384/536–537, 543, 609; 360/83, 86, 99.08; 310/90, 91, 105, 268
See application file for complete search history.

(56) References Cited

U.S. PATENT DOCUMENTS

| | | | | |
|---|---|---|---|---|
| 5,331,483 A * | 7/1994 | Muller et al. | ............ | 360/99.08 |
| 5,492,418 A * | 2/1996 | Brossard | ............ | 384/536 |
| 5,608,281 A * | 3/1997 | Gerling et al. | ............ | 310/268 |
| 5,716,146 A | 2/1998 | Murai et al. | ............ | 384/450 |
| 6,296,394 B1 * | 10/2001 | Braun et al. | ............ | 384/535 |
| 6,450,689 B1 * | 9/2002 | Takatsu | ............ | 384/543 |
| 6,548,929 B2 * | 4/2003 | Nelson et al. | ............ | 310/105 |
| 6,661,144 B1 * | 12/2003 | Diener et al. | ............ | 310/105 |
| 6,863,443 B2 * | 3/2005 | Mahling | ............ | 384/536 |
| 2004/0036375 A1 * | 2/2004 | Pittius | ............ | 310/183 |
| 2004/0142808 A1 * | 7/2004 | Mackel | ............ | 494/82 |
| 2005/0006970 A1 * | 1/2005 | Klingenberg et al. | ............ | 310/91 |
| 2006/0289209 A1 * | 12/2006 | Grosspietsch et al. | ............ | 180/65.2 |
| 2007/0138877 A1 * | 6/2007 | Moench et al. | ............ | 310/91 |

FOREIGN PATENT DOCUMENTS

| | | |
|---|---|---|
| DE | 28 19 366 | 11/1979 |
| DE | 38 30 386 | 3/1990 |
| DE | 197 55 563 | 2/1999 |
| DE | 102 10 071 | 10/2003 |

* cited by examiner

*Primary Examiner* — Marcus Charles
(74) *Attorney, Agent, or Firm* — Ostrolenk Faber LLP

(57) ABSTRACT

A revolving joint comprising at least one anti-friction bearing and an electromotive drive unit. The anti-friction bearing is in contact with at least one row of rolling bodies arranged in a row rotating the joint around the rotational axis of the anti-friction bearing. The rolling bodies are in contact with at least one race that can be driven to rotate by the drive unit.

17 Claims, 1 Drawing Sheet

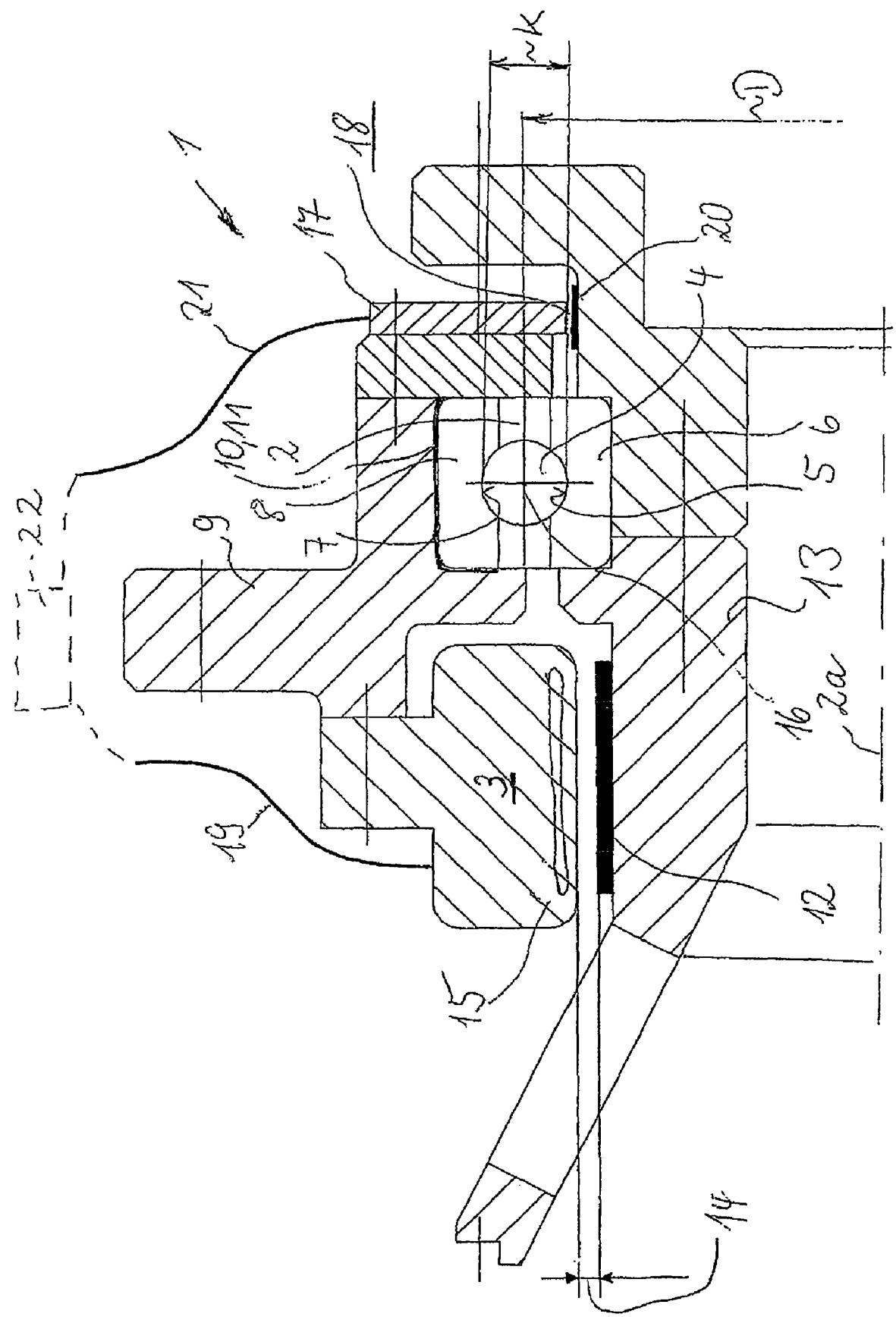

REVOLVING JOINT

CROSS REFERENCE TO RELATED APPLICATION

The present application is a 35 U.S.C. §§371 national phase conversion of PCT/DE 2005/001984, filed 4 Nov. 2005, which claims priority of U.S. Provisional Application No. 60/627,541, filed 12 Nov. 2004. The PCT International Application was published in the German language.

FIELD OF THE INVENTION

The invention concerns a revolving joint with at least one rolling contact bearing and with an electromotive drive unit, wherein the rolling contact bearing is provided with at least one row of rolling bodies which are arranged around the rotational axis of the rolling contact bearing and are in contact with at least one running track which can be driven by the drive unit.

BACKGROUND OF THE INVENTION

A revolving joint of this type is described in DE 10210071 A 1. Integrated and low-noise revolving joint systems can be used in a versatile manner and generally serve to drive, to connect and support and to detect the positions of rotating masses and to couple them to static components.

Cataloged revolving joints with rolling contact bearings are used nowadays in many industrial applications. In most cases, these are rolling contact bearings with an outer race and inner race, and are optionally provided with axial fastening bores and/or fastening threads to attach and to fasten them to the static component and the rotating mass.

In the sphere of medical technology, revolving joints with rolling contact bearings are used in computer tomographs. Furthermore, the revolving joint with rolling contact bearings is used in similar radiographic equipment to investigate items of luggage in the security sphere, for example at airports. Known revolving joints with rolling contact bearings are unsuitable to meet the constant rise in rotational speeds of these applications with the simultaneous requirement for reduced noise, low starting torque, small construction space, low weight and high running accuracy, and no longer meet the demands of using them in this way.

For computer tomographs to record and reconstruct images, the precise angular position and position of the rotating components has to be known. There are various measuring devices which operate according to various measuring principles (inductive, optical, capacitive, etc.) for this.

SUMMARY OF THE INVENTION

It is the object to provide a revolving joint which meets the previously mentioned requirements.

This object may be achieved according to the disclosure hereof by a measurable running noise at the electromotively driven revolving joint, said running noise, measured as airborne sound, having cumulative sound pressure levels with values of at most 70 dB(A), preferably 67 dB(A). The measurement of noise is undertaken at 1 m horizontal distance from the bearing plane on the theoretical continued line of the rotational axis.

The rolling contact bearing has at least one inner running track and one outer running track. A plurality of running tracks are also conceivable in the rolling contact bearing. The rolling bodies are in contact, and during operation of the rolling contact bearing are in rolling contact, with at least one inner running track and outer running track, and, alternatively, also with running tracks oriented axially.

The rolling bodies revolving in the rolling contact bearing cause noises in the form of solid-borne sound. In general, the higher the operating speed, the louder is the noise generated. A solid-borne-sound insulating means of the rolling contact bearing prevents the solid-borne sound from propagating into the surrounding parts and therefore reduces the production of noise. In this case, the surface area and/or lateral area of at least one of the rolling contact bearing races is insulated from the surrounding parts in terms of solid-borne sound. The material used here for the solid-borne-sound insulating means has an impedance ratio p of at least 3 in comparison to the material of the rolling contact bearing race. The impedance ratio p is defined as follows:

$$p = \frac{\sqrt{E_1 \times \rho_1}}{\sqrt{E_2 \times \rho_2}}$$

p Impedance ratio
E1 Modulus of elasticity of the rolling contact bearing race
ρ1 Density of the rolling contact bearing race
E2 Modulus of elasticity of the insulating material
ρ2 Density of the insulating material A further feature of the low-noise rolling contact bearing is the surface topography of the running tracks, which is determined by a defined waviness and/or surface roughness. The roughness of the running track is set to a value of not greater than Ra 0.25. The Ra detail is a known and internationally standardized value which is defined as an arithmetic mean value according to DIN EN 4287: the following features are based on the waviness concept, which is also known per se:

at least the surface of the running track is described by any desired number of surface lines adjacent parallel to one another with profiles which are each wave-shaped in the circumferential direction and therefore deviate from the imaginary ideal profile which encircles the rotational axis and is designed entirely in the form of a circular curve, the profiles are each described by waves which follow one another in an alternating manner in the circumferential direction (about the rotational axis) and, in the process, repeatedly intersect the particular ideal profile, average values of sums of all of the waviness amplitudes between wave crest tip and wave trough bottom of any desired number of periods of the waves of a measuring range on one surface line in each case correspond at maximum to a quotient of the constant 0.33 in mm/min and of the rotational speed in rpm, and the measuring range is defined by the curve length along the respective running track between the respective contacts with the running track of two rolling bodies of a row that follow each other in the circumferential direction.

According to this definition, for example for an operating speed n=120 min$^{-1}$ and a distance between rolling bodies=30 mm (nominal size, without taking any dimensional deviations within permissible tolerance limits into consideration), a max. permissible waviness amplitude of the running tracks of 0.0028 mm arises.

A revolving joint system which is of low-noise design according to the invention and comprises a rolling contact bearing and drive unit is compact and takes up little construction space. It reliably absorbs high radial, axial and torque loads. The direct drive is preferably an integral part of the revolving joint system and therefore does not take up any additional construction space. The rotating revolving joint system causes a particularly low level of noise in all rotational speed ranges, but in particular at rotational speeds above 100 rpm (1/min), preferably above 160 rpm because of the integration of a rolling contact bearing of particularly low-noise design, optionally combined with the solid-borne-sound insulating means. The revolving joint can be produced cost-effectively owing to the small number of components used and its compactness.

The direct drive ensures that the driving forces of the direct drive are transmitted to the revolving joint with rolling contact bearings without the interconnection of further drive components (such as, for example, belts or gearwheels, etc.), brake generators or deflecting and clamping rollers.

The electromotive drive unit which is preferably integrated into the revolving joint as a direct drive is designed as a torque motor of annular or segmental construction, with a static component of the revolving joint being connected to at least one stator comprising iron cores and electrical windings. One of the rotating components of the revolving joint is equipped with permanent magnets.

It is furthermore advantageous that, with the aid of the torque motor of segmental construction or designed as an annular motor, different motor powers can be provided by putting together one or more individual segments up to a completely closed ring for the drive. The total driving power thereof is dependent on the number and size of the stator segments used. If only low rotational speeds and small torques are required, then wide gaps can be left between the individual stator segments. The torque motor is even operational if there is only one stator segment, if a relatively low driving power is required. If a high power is required for active rotation, acceleration or braking of the revolving joint system, then the annular motor construction is to be selected.

In contrast to the annular motor, a torque motor of segmental construction has to be operated in a controlled manner so that the magnetic forces of each individual segment are synchronized with one another and therefore the best possible efficiency and the lowest noise level are achieved. According to one refinement of the invention, the frequency-converter input signal required for this, in order to activate the segments, is provided by the integrated sensor system for detecting position. If very high torques are required (for example during a short starting phase of the rotating components), then efficient operation of the annular motor likewise by means of the controlled operation is possible. By means of the controlled operation of the drive unit, high torques can be realized at a simultaneously relatively low power stage of the frequency converter.

In order to detect the position of the rotating parts, for example those for recording and reconstructing images in computer tomographs, a position measuring system can additionally be integrated with the sensor system into the revolving joint system. The sensor system has at least one sensor and a signal transmitter. The sensor serves to detect signals of the signal transmitter (encoding means) or else has a plurality of the previously mentioned components in any desired embodiment. For example, the encoding means is formed by an elastomer belt which is charged with magnetized particles with alternating polarity (alternately north and south poles). The sensor system may also have further electronic components, for example transducers.

Rolling contact bearings of any desired number and any desired constructional shape are inserted into the revolving joint. The rolling contact bearings are realized in a single row or in a number of rows. The rolling bodies are balls or rollers which can be held in cages.

The material of the rolling bodies and of the running tracks is preferably steel or else all other conceivable materials, such as materials with a density which is less than 5 grams per cubic millimeter. Materials of this type are, for example, ceramic materials.

Low-noise thin-ring four-point ball bearings are preferably used. According to one refinement of the invention, for bearings of this type, the ratio of the diameter of the reference circle to the diameter of each one of the rolling bodies of a row is greater than 30:1, preferably 40:1, with the reference circle being the imaginary circle which is arranged concentrically with respect to the rotational axis and which, irrespective of possible changes in position of the rolling bodies due to clearances in the rolling contact bearing, intersects the center axes of the rolling bodies, which center axes are oriented parallel to the rotational axis. In the case of rollers, the center axes are the rotational axes or axes of symmetry and, in the case of balls, are imaginary axes running through the center of the ball and parallel to the rotational axis of the revolving joint.

The thin-ring four-point ball bearing is the simplest and most robust constructional form of the bearing. It is configured in such a manner that average axial, radial and torque loads can be reliably absorbed. The thin-ring bearing with its low inherent and dimensional stability is supported by being fitted into the surrounding parts.

Furthermore, wire-race bearings, angular ball bearings and roller bearings are used.

Furthermore, the integrated and low-noise revolving joint system affords the possibility of integrating the running tracks of the rolling contact bearings into the surrounding parts, the running tracks of the rolling contact bearings then being directly incorporated into the corresponding surrounding part. A surrounding part is, for example, a housing into which the rolling contact bearing, or at least one of the bearing races or at least one of the running tracks is integrated, and/or a rotor or a shaft on which the rolling contact bearing, or at least one of the bearing races or at least one of the running tracks is arranged.

BRIEF DESCRIPTION OF THE DRAWINGS

FIG. 1 shows a cross section through a half of a revolving joint of the invention.

DESCRIPTION OF A PREFERRED EMBODIMENT

FIG. 1 shows a revolving joint 1 with at least one rolling contact bearing 2 and with an electromotive drive unit 3 in a partial section along the rotational axis 2a and not illustrated to scale. The rolling contact bearing 2 has a row of rolling bodies 4 arranged around the rotational axis 2a of the rolling contact bearing 2. The rolling bodies 4 are in contact with a running track 5, which can be driven by the drive unit, on an inner race 6 and in contact with a running track 7 on an outer race 8. The outer race 8 is fixed in a rotationally fixed surrounding part in the form of a housing 9.

Between the outer race 8 and the housing 9 there is a solid-borne-sound insulating means 10 in the form of an insulating layer 11 which is made from an elastomer and is vulcanized onto the outer race 8. Alternatively, the insulating layer 11 is an insert.

A torque motor of the drive unit 3 has permanent magnets 12 which sit directly on a rotor 13 of the revolving joint 1. The rotor 13 of the torque motor is coupled in a rotationally fixed manner to the driven running track 5 and is separated from electrical windings (not illustrated in detail) of a stator 15 of the torque motor by an air gap 14 encircling the rotational axis 2a.

The ratio of diameter D of the reference circle to the diameter K of each one of the rolling bodies 4 of the row is greater than 30:1, with the reference circle being the imaginary circle which is arranged concentrically with respect to the rotational axis 2a and which intersects the center axes 16 of the rolling bodies 4, which center axes are oriented parallel to the rotational axis 2a and butt perpendicularly into the plane of the illustration. The rolling bodies 4 and bearing races 6 and 8 are optionally made of steel or of ceramic, with combinations of rolling bodies and components of the rolling contact bearing made of steel with components and rolling bodies made of ceramic being conceivable.

In the revolving joint there is a sensor system 18 comprising a sensor 17 and an encoding means 20 with which at least relative positions in the circumferential direction between the rotor 13 and the stator 15 can be detected. The sensor 17 is fixed on the stator 15 and the encoding means 20 on the rotor 13. A connecting cable 21 branches off from the sensor and can also optionally be connected to the control unit 22 (indicated by dashed lines). From the control unit 22, a connecting cable 19 leads to the drive unit 3, and therefore the control unit 22 can convert output signals of the sensor system 18 into input signals in order to control the torque motor.

The invention claimed is:

1. A revolving joint comprising:
at least one rolling contact bearing and an electromotive drive unit;
the rolling contact bearing includes at least one row of rolling bodies arranged around a rotational axis of the joint, at least one running track driven by the drive unit and the rolling bodies are in contact with the at least one track;
at least a surface of the running track in contact with the rolling bodies is described by a number of surface lines adjacent and parallel to one another with profiles which are each wave-shaped in the circumferential direction and which therefore deviate from an imaginary ideal profile and the track surface encircles the rotational axis of the joint and is entirely in the form of a circular curve;
the joint is configured and operable so that it generates a measurable running noise at the electromotively driven revolving joint, the noise being measured as air-borne sound and has sound pressure levels with values of at most 72 dB(A);
the profiles of the surface lines are each described by waves which follow one another in an alternating manner in the circumferential direction and thereby repeatedly intersect the particular ideal profile;
the maximum value of all of waviness amplitudes between a wave crest and a wave trough of any desired number of periods of a measuring range on one of the surface lines in each case corresponds at maximum to a quotient of the constant 0.33 in mm/min and of the rotational speed of the driven running track in rpm; and
the measuring range is defined by the nominal size of the curve length along the running track between the respective contacts with the running track of two rolling bodies of a row of rolling bodies that follow one another in the circumferential direction.

2. The revolving joint as claimed in claim 1, further comprising at least one second running track, and surface lines with the wavy profiles on the at least one second running track, and the second running track is in contact with the rolling bodies of the row of the rolling bodies.

3. A revolving joint comprising:
at least one rolling contact bearing and an electromotive drive unit;
the rolling contact bearing includes at least one row of rolling bodies arranged around a rotational axis of the joint, at least one running track driven by the drive unit, and the rolling bodies are in contact with the at least one track;
the joint is configured and operable so that it generates a measurable running noise at the electromotively driven revolving joint, the noise being measured as air-borne sound and has sound pressure levels with values of at most 72 dB(A);
a solid-borne-sound insulating device at least at one of a) the at least one running track and surroundings of the running track, b) at intersections between components of the revolving joint and c) at intersections of the revolving joint with the surroundings of the revolving joint; and
an impedance ratio (p) of at least the value 3, wherein the impedance ratio (p) is a quotient of a square root of a product of modulus of elasticity ($E_1$) and density ($\rho_1$)) of a material of the at least one running track and of the square root of a product of modulus of elasticity ($E_2$) and density (ρ2) of a material of the insulating device, ie., the ratio $$p = \frac{\sqrt{E_1 \times \rho_1}}{\sqrt{E_1 \times \rho_2}}.$$

4. The revolving joint as claimed in claim,3 wherein the sound insulating device comprises an insulating layer as solid-borne, the insulating layer being of at least one material having at least one of a modulus of elasticity and a density which is lower than that of the material of a component of the joint on which the at least one running track is formed.

5. The revolving joint as claimed in claim 3 wherein the insulating layer is of at least one elastomer material.

6. The revolving joint as claimed in claim,3 further comprising a bearing race on which the at least one running track is formed.

7. A revolving joint comprising:
at least one rolling contact bearing and an electromotive drive unit;
the rolling contact bearing includes at least one row of rolling bodies arranged around a rotational axis of the joint, at least one running track driven by the drive unit and the rolling bodies are in contact with the at least one track;
the joint is configured and operable so that it generates a measurable running noise at the electromotively driven revolving joint, the noise being measured as air-borne sound and has sound pressure levels with values of at most 72 dB(A); and
the drive unit comprises a torque motor including a station and a motor and permanent magnets, and the permanent magnets of the torque motor of the drive unit are coupled in a rotationally fixed manner by the at least one running track, which is a driven track, to the rotor of the torque motor and at an air gap encircling the rotational axis of the joint, the magnets are opposite the stator of the torque motor, wherein at least the stator and the permanent magnets are separated from each other by the air gap.

8. The revolving joint as claimed in claim 7, wherein the running track is driven electromotively by the drive unit and is rotatable about the rotational axis at rotational-speed values of at least 80 rpm.

9. The revolving joint as claimed in claim 7, wherein the at least one running track driven by the drive unit and at least one second running track of the bearing have surface roughnesses of respective surfaces thereof in contact with the rolling bodies where Ra values <0.25, wherein the row of rolling bodies are in contact with the second running track.

10. The revolving joint as claimed in claim 7, wherein a bearing race having the running track is fixed to the rotor and the permanent magnets are fixed to the rotor.

11. The revolving joint as claimed in claim 10, having deviations of maximum 0.5 mm from a nominal size of the radial dimensions of the air gap in all operating states of the revolving joint.

12. The revolving joint as claimed in claim,7 wherein the rolling bodies define a reference circle, which is arranged concentrically with respect to the rotational axis and intersects center axes of the rolling bodies, and a ratio of a diameter of the reference circle to a diameter of each one of the rolling bodies of a row thereof is greater than 30:1 the reference circle being the imaginary circle.

13. The revolving joint as claimed in claim 12, wherein the center axes of the rolling bodies are oriented parallel to the rotational axis.

14. The revolving joint as claimed in claim 7, wherein at least some of the rolling bodies of the row are made from a material with a density $\rho <= 5$ g/cm$^3$.

15. The revolving joint as claimed in claim 7, wherein at least some of the rolling bodies of the row are of a material which provides insulation against electric current, wherein the specific electrical resistance of the material is greater than $10^{10}$ Ohm ×mm$^2$/m.

16. A revolving joint comprising:
at least one rolling contact bearing and an electromotive drive unit;
the rolling contact bearing includes at least one row of rolling bodies arrange around a rotational axis of the joint, at least one running track driven by the drive unit and the rolling bodies are are in contact with the at least one track;
the joint is configured and operable so that it generates a measurable running noise at the electromotively driven revolving joint, the noise being measured as air-borne sound and has sound pressure levels with values of at most 72 dB(A); and
a sensor system in the revolving joint operable to detect at least relative positions in the circumferential direction between a rotor of a torque motor of the drive unit and a stator of the torque motor, wherein the rotor is coupled in a rotationally fixed manner to the at least one running track.

17. The revolving joint as claimed in claim 16, further comprising a control unit, which is coupled to the torque motor and to the sensor system, for converting output signals of the sensor system into input signals to control the torque motor.

* * * * *